US012773970B2

(12) United States Patent
Rodrigues

(10) Patent No.: US 12,773,970 B2
(45) Date of Patent: Oct. 27, 2026

(54) PRODUCTION LINE AND TROLLEY FOR USE THEREIN

(71) Applicant: ABB Schweiz AG, Baden (CH)

(72) Inventor: José Rodrigues, Bad Homburg (DE)

(73) Assignee: ABB Schweiz AG, Baden (CH)

( * ) Notice: Subject to any disclaimer, the term of this patent is extended or adjusted under 35 U.S.C. 154(b) by 334 days.

(21) Appl. No.: 18/411,305

(22) Filed: Jan. 12, 2024

(65) Prior Publication Data

US 2024/0149842 A1 May 9, 2024

Related U.S. Application Data

(63) Continuation of application No. PCT/EP2021/069752, filed on Jul. 15, 2021.

(51) Int. Cl.

| | |
|---|---|
| ***B60S 5/02*** | (2006.01) |
| ***B60L 53/30*** | (2019.01) |
| *B60J 5/06* | (2006.01) |
| *B65G 67/02* | (2006.01) |

(52) U.S. Cl.

CPC ................ *B60S 5/02* (2013.01); *B60L 53/30* (2019.02); *B60J 5/06* (2013.01); *B65G 67/02* (2013.01)

(58) Field of Classification Search

CPC . B65G 67/00; B65G 67/02; B60J 5/06; B60L 53/30

USPC .......................................................... 414/572

See application file for complete search history.

(56) References Cited

U.S. PATENT DOCUMENTS

| | | | | |
|---|---|---|---|---|
| 2024/0317091 A1* | 9/2024 | Carter | ...................... | B60L 50/11 |

FOREIGN PATENT DOCUMENTS

| | | | | | |
|---|---|---|---|---|---|
| CN | 101460258 | A | 6/2009 | | |
| EP | 3056454 | A1 * | 8/2016 | ........... | G06Q 10/087 |
| EP | 3689720 | A1 * | 8/2020 | ............. | B62D 63/04 |
| JP | 62-2802 | A | 1/1987 | | |
| JP | S622802 | A | 1/1987 | | |
| JP | H02123022 | A | 5/1990 | | |
| JP | 11285109 | A * | 10/1999 | | |
| JP | 2004-359362 | A | 12/2004 | | |
| JP | 2014-73885 | A | 4/2014 | | |
| KR | 20170045158 | A | 4/2017 | | |

OTHER PUBLICATIONS

English Translation (Year: 2016).*
European Patent Office, International Search Report in International Patent Application No. PCT/EP2021/069752, 5 pp. (Mar. 31, 2022).

(Continued)

*Primary Examiner* — Terrell H Matthews
(74) *Attorney, Agent, or Firm* — Whitmyer IP Group LLC

(57) ABSTRACT

A production line for processing a work piece in successive steps comprises a plurality of stations and a plurality of trolleys, each of which comprises a first connector, said plurality of stations comprising at least one workstation adapted for carrying out therein an associated one of said steps and at least one charging station comprising a second connector for providing a commodity to one of said trolleys when connected to the first connector of said trolley. At least one of said trolleys comprises a second connector which communicates with the first connector.

13 Claims, 3 Drawing Sheets

(56) References Cited

OTHER PUBLICATIONS

European Patent Office, Written Opinion in International Patent Application No. PCT/EP2021/069752, 8 pp. (Mar. 31, 2022).
Office Action and search report issued in corresponding Chinese Application No. 202180100450.6; dated Jan. 30, 2026; in Chinese with English machine translation (20 pages).

* cited by examiner

PRODUCTION LINE AND TROLLEY FOR USE THEREIN

CROSS-REFERENCE TO RELATED APPLICATIONS

The instant application claims priority to International Patent Application No. PCT/EP2021/069752, filed Jul. 15, 2021, which is incorporated herein in its entirety by reference.

FIELD OF THE DISCLOSURE

The present disclosure relates to a production line and to a trolley for use in the production line.

BACKGROUND OF THE INVENTION

Since the introduction of the assembly line, it has been a paradigm that for cost-effective mass production, work pieces shall be subjected to identical processing steps by being conveyed from one workstation, where one processing step is carried out, to a next workstation, where a next processing step is carried out, thus applying identical processing steps to all work pieces and outputting identical finished articles at the last one of the workstations. Ideally, such workstations will be adjacent to each other, so that a work piece, after having been processed in one workstation, can be forwarded to the next with minimum loss of time. Still, time can be lost in such a production line when cycle times of the workstations differ, and a fast workstation is compelled to wait for a subsequent, slower workstation to finish a task before it can forward there a work piece that has been processed by it, and accept a further one.

Computer control has allowed more flexible production schemes, in which work pieces may be conveyed along different paths between workstations using trolleys which can move more or less unconstrained on a workshop floor wherever there is space enough for them to pass. This allows a workstation that has finished its job on a given work piece to discharge that work piece to a trolley, and immediately accept a new one, whereas the trolley can convey the work piece to the any one of several workstations dedicated to the next processing step, that happens to be idle or will soon finish its current work piece. In such a production line, efficiency can suffer because trolleys need to recharge and are therefore not available, or if recharging trolleys block the path of busy ones. Of course, a shortage of operative trolleys can be prevented by providing a large number thereof, but the larger their number is, the more likely they are to block one another's way. Charging trolleys can be prevented from blocking the busy ones by providing charging stations remote from the work stations, but charging trolley will still occupy considerable space that might be put to better use, and moving to the charging stations and back also keeps the trolleys occupied unproductively.

BRIEF SUMMARY OF THE INVENTION

The present disclosure generally describes a highly efficient production line and trolleys for use in such a production line. According to a first aspect of the disclosure, this object is achieved by a production line for processing a work piece in successive steps, the production line comprising a plurality of stations and a plurality of trolleys, each of which comprises a first connector, said plurality of stations comprising at least one workstation adapted for carrying out therein an associated one of said steps and at least one charging station comprising a second connector for providing a commodity to one of said trolleys when connected to the first connector of said trolley, wherein at least one of said trolleys comprises a second connector which communicates with the first connector.

When said trolley has its first connector connected to the second connector of a charging station, not only can the trolley take in the commodity provided by the charging station, but it can also forward it to a second trolley which docks to its second connector. Thus, the number of charging stations can be reduced, and the space that these would otherwise require can be put to more productive use.

In a preferred embodiment, at least one of said workstations is also a charging station. This allows a trolley to take in the commodity while it is occupied at the workstation, thus reducing the time spent unproductively on charging. The larger the fraction of workstations is that are also charging stations, the more frequently the trolley can recharge without having to abandon productive work, and the smaller is the fraction of downtime spent at a station which is only a charging station. Ideally, the fraction of workstations that are also charging stations is so large stations which are only charging stations can be done without.

The commodity to be recharged can be any of electric power, data, fuel, pressurized gas or vacuum. Preferably it comprises at least one of electric power and pressurized gas. The possibility to recharge frequently at several workstations visited in the course of an operating cycle of the trolley reduces storage capacity requirements, which reduces cost and weight of the trolleys.

By making the second connector of said trolley identical to the second connector of one of said charging stations, it is ensured that the trolley can recharge by docking directly to a charging stations or by docking to another trolley which is already charging there. Thus no time is lost waiting for an opportunity to recharge. Further, when the charging station also is a workstation, the trolley can thus make good use of the time it spends waiting while the workstation is busy with a work piece conveyed by the other trolley docked between it and the workstation.

In a particularly preferred embodiment, the storage space of the trolley is a dust-proof compartment having at least one port adapted to be coupled in a dust-proof manner to mating ports of said at least one workstation. Such a dust-proof compartment is particularly for transporting freshly painted work pieces, i.e. in a production line wherein the processing step associated to at least one of the workstations is a painting step.

BRIEF DESCRIPTION OF THE SEVERAL VIEWS OF THE DRAWING(S)

DETAILED DESCRIPTION OF THE INVENTION

Figure 1:
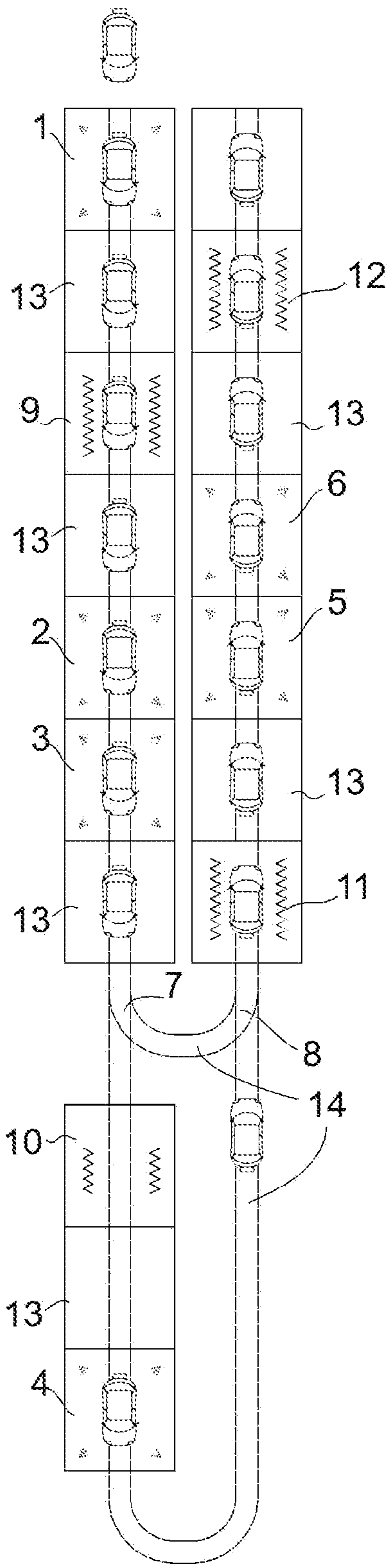
Fig. 1 prior art
FIG. 1 is a schematic diagram of a conventional production line.

FIG. 1 is a schematic diagram of a conventional production line for painting car bodies. Workstations of the production line comprise paint stations 1-6. Paint station 1 is for applying a primer to the white car body, stations 2 and 3 for applying a base coat to an inside and an outside of the car body, respectively, and stations 5, 6 for applying a clear coat inside and outside.

While for painting a car body in a single color, paint stations 1-3, 5 and 6 will be sufficient, a further paint station is necessary if a customer's wish for a multicolor body is to be satisfied, e.g., if the roof is to have a color different from the rest of the car body. Integrating such a further paint station into a linear path of the car bodies would lead to an increase in processing time for all car bodies, and would leave the further paint station idle most of the time. Therefore, the production line of FIG. 1 provides a track switch 7 where a car body can be sent to paint station 4, if required, whereas all others go straight to paint stations 5, 6, and a track switch 8 where paths of the car bodies having undergone painting in station 4 and of those that haven't reunite.

When one layer of paint has been applied, and before applying a next one, the car bodies are flashed, i.e. volatile components of the layer are given time to evaporate, and baked. The production line of FIG. 1 therefore has baking stations 9 between paint stations 1 and 2, 10 between paint stations 3 and 4, 11 between track switch 8 and paint station 5 and 12 behind paint station 6. Flashing stations 13 are provided between stations 1 and 9, stations 9 and 2, station 3 and track switch 7, and various other places as shown in FIG. 1.

Due to the track switches 7, 8, not all stations of the production line can be directly adjacent and sealably coupled to each other. Wherever tracks 14 for conveying the car bodies extend outside a workstation, they have to be tightly shrouded in order to ensure that no dust will settle on the car bodies during conveyance.

Figure 2:
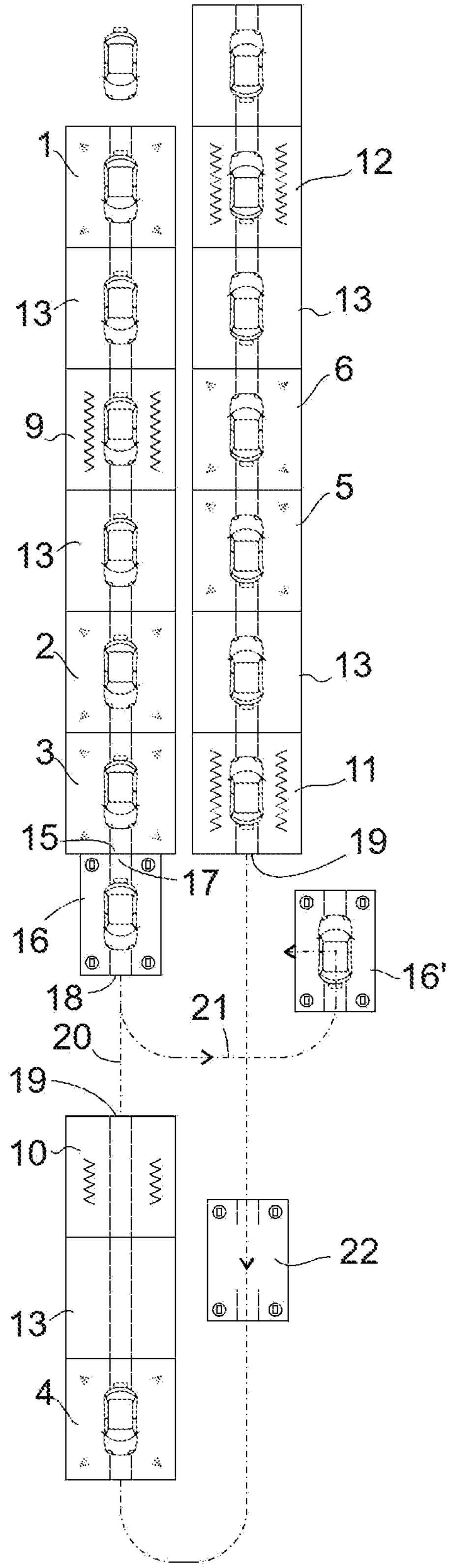
FIG. 2 is a schematic diagram of a first production line in accordance with the disclosure.

FIG. 2 illustrates a production line according to the invention. The workstations of this production line are the same as in FIG. 1, and the steps of the painting process carried out by them are also identical. Therefore, the same reference numerals as in FIG. 1 will be used for the workstations, and their description will not be repeated here.

As in FIG. 1 there are three groups of adjacent workstations, the first comprising paint stations 1, 2, 3 and baking station 9, the second comprising baking station 10 and paint station 4, and the third comprising paint stations 5, 6 and baking stations 11, 12. Between the groups, no tracks are provided. Instead, there is a flat floor surface between the groups where vehicles can move freely in two dimensions, unconstrained by tracks.

Paint station 3 has an outlet port 15 for ejecting a car body after having applied the base coat to its outside. A trolley 16 is shown coupled to the outlet port 15 for receiving the car body. When the car body has been loaded on the trolley 16, the trolley 16 drives it to the next station where the car body is to be processed. In the case shown, this is either baking station 11 or baking station 10. There is no flashing station at the outlet side of paint station 3, since the time the car body spends being ferried on board the trolley serves the purpose of a flashing stage.

The trolley 16 has an inlet port 17 for coupling to the outlet port 15 of paint station 3, and an outlet port 18 opposite the inlet port 17, which can be coupled to inlet ports 19 of baking stations 10 or 11, in order to unload the car body.

Ports 15, 19 of workstations 3, 10 face each other, so that the trolley 16 can move from one to the other along a straight line 20, whereas moving from the paint station 3 to baking station 11 involves a U-turn 21. In FIG. 2, the U-turn 21 is wider than necessary to reach workstation 11, at the end of the U-turn, a second image 16' of trolley 16 is shown in a parking position laterally offset with respect to inlet port 19 so that another trolley 22 can finish unloading a car body into workstation 11 and then move away. Such a situation may arise since when a car body has been processed in paint station 4, it and the next car body finished by paint station 3 will compete for a place in baking station 11. Use of the trolley allows to keep one (or more) car bodies waiting for admission to baking station 11, whenever the need arises.

Figure 3:
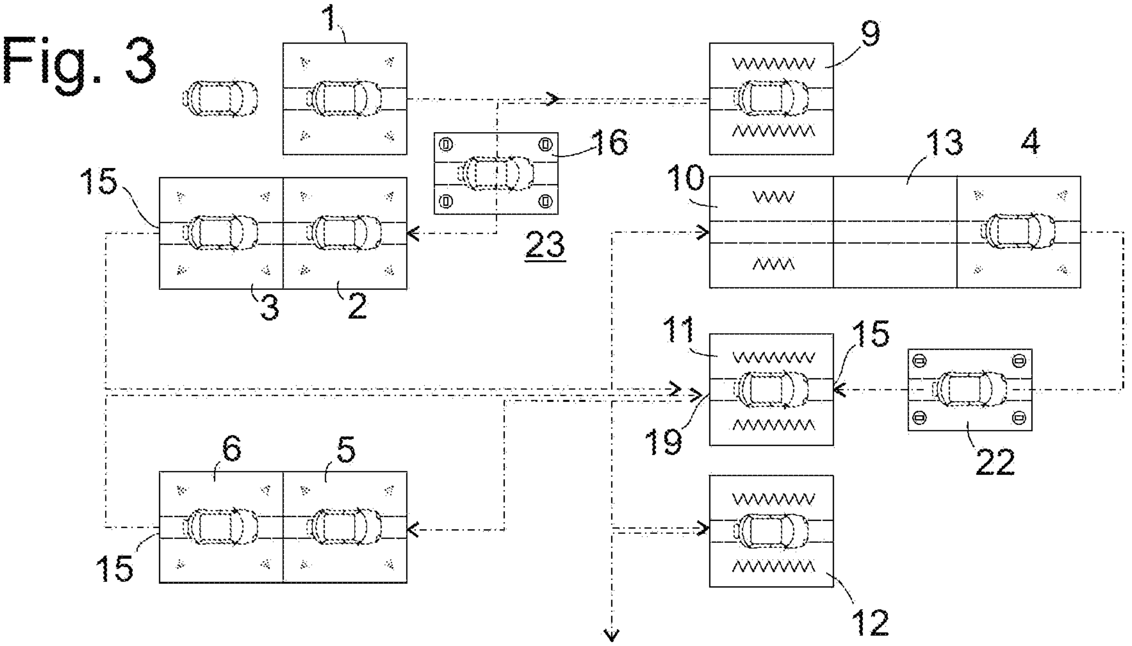
FIG. 3 is a schematic diagram of a second production line in accordance with the disclosure.

FIG. 3 illustrates a second embodiment of a production line which exploits the possibilities offered by the trolleys more systematically than that of FIG. 2. There is only one flashing station 13 left in this production line; all others have been replaced by trolleys. While only two trolleys 16, 22 are shown in FIG. 3, their number may be larger, as necessary e.g. to serve as temporary storage for car bodies that have to wait for a next processing step. The number of trolleys is smaller than the number of flashing stations 13 in FIG. 2, since times needed for flashing are shorter than those for painting or baking. Thus one trolley, by transporting car bodies between more than one pair of stations, can replace more than one flashing station, saving space and cost.

Painting stations 1-6 are identical to those of FIGS. 1 and 2 and serve the same purpose. Obligatory paint stations 1-3, 5 and 6 are located on one side of a central corridor 23, facultative paint station 4 and baking stations 9-12 on the other. When primer has been applied to a car body in paint station 1, one of the trolleys 16, 22 will come and shuttle it across the corridor 23 to baking station 9. Trolley 16 is shown carrying a car body from baking station 9 to paint station 2. Since paint stations 2, 3 are arranged in line, the trolleys have to fetch a car body that got its base coat applied in stations 2, 3 at the outlet port 15 of station 3 facing away from corridor 23 and convey it from there to one of baking station 11 or, if the body is to be painted in more than one color, baking station 10.

Baking station 10, flashing station 13 and paint station 4 are arranged adjacent to each other so that a car body that was delivered to baking station can be conveyed to paint station 4 without the use of a trolley. Trolley 22 is shown fetching a car body from paint station 4 and delivering it to baking station 11. Alternatively, it might deliver it once more to baking station 10. By thus sending the car body once more through paint station 4, as many different colors as desired can be applied to parts of the car body, with no additional investment in machinery required.

Trolley 22 is delivering its car body to a port 15 of baking station 11 facing away from corridor 23, since, coming from paint station 4, it is the fastest and easiest port to reach. I.e. every port 15, 19 of station 11 can serve both as an inlet or an outlet port, as needed.

If at the time when trolley 22 has to deliver its car body, baking station 11 is occupied while baking station 12 is not, trolley 22 is adapted to detect the fact and to deliver to baking station 12 instead.

When a car body that previously passed through paint stations 2, 3 and, eventually, 4, is taken out of baking station 11, it is conveyed to paint station 5 by a trolley not shown. From the outlet port 15 of paint station 6, it is conveyed back to any of baking stations 11, 12 that happens to be free. After treatment in this last baking station, the painting process is finished, and the car body is conveyed to a subsequent assembly line.

Figure 4:
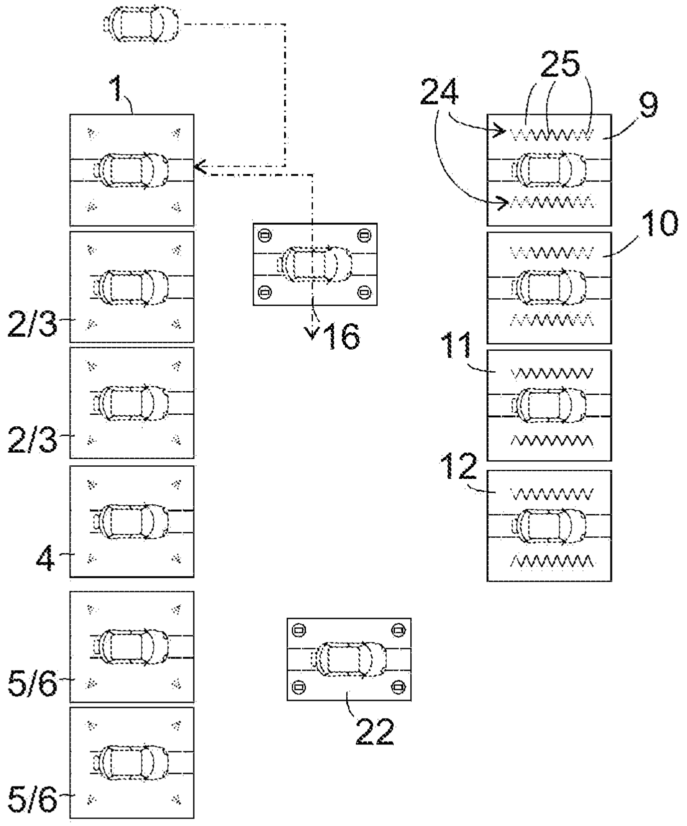
FIG. 4 is a schematic diagram of a third production line in accordance with the disclosure.

FIG. 4 illustrates a further optimized embodiment of the production line. Here, all transport of the car bodies is done by the trolleys, from loading the white body into paint station 1 to unloading the fully painted body from one of the baking stations. Pairs of stations 2, 3 and 5, 6 for painting inside and outside of the car bodies have been replaced by combined stations 2/3 and 5/6, respectively, each of which is designed to paint inside and outside. Since the time required for processing a car body in each of the combined stations 2/3 and 5/6 is longer than in the single-function stations 2, 3 and 5, 6 of the previous embodiments, more than one of each type is provided. Thus, a processed car body can be unloaded from one of e.g. stations 2/3 and replaced by a new one while the other is occupied processing one car body, and one trolley 16 or 22 is sufficient to serve them both.

Paint stations 1, 2/3 and 5/6 and baking stations 9-12 are disposed at opposite sides of corridor 23. All are loaded and unloaded through ports facing the corridor 23. Since it is no longer necessary to convey the car bodies through the workstations, conveying means of the workstations can be dispensed with; it is sufficient if the trolleys have conveying means with an operating range sufficient to place a car body appropriately within the workstations 1-6, 9-12 and to withdraw it from there.

At least some of the baking stations 9-12, e.g. stations. 9 and 10, have heaters 24 that are displaceable or have independently controllable segments 25 in order to apply heat locally to a part of a car body that is to receive a further paint layer on top of the base coat in paint station 4. Thus, when a car body is taken out from one of stations 2/3 and is destined for paint station 4, the trolley will have to take it to one of stations 9, 10; else it can take it to any one of baking stations 9-12 that is or will soon be available. Also, car bodies that are removed from stations 4 or 5/6 can be baked in any of stations 9-12.

Figure 5:
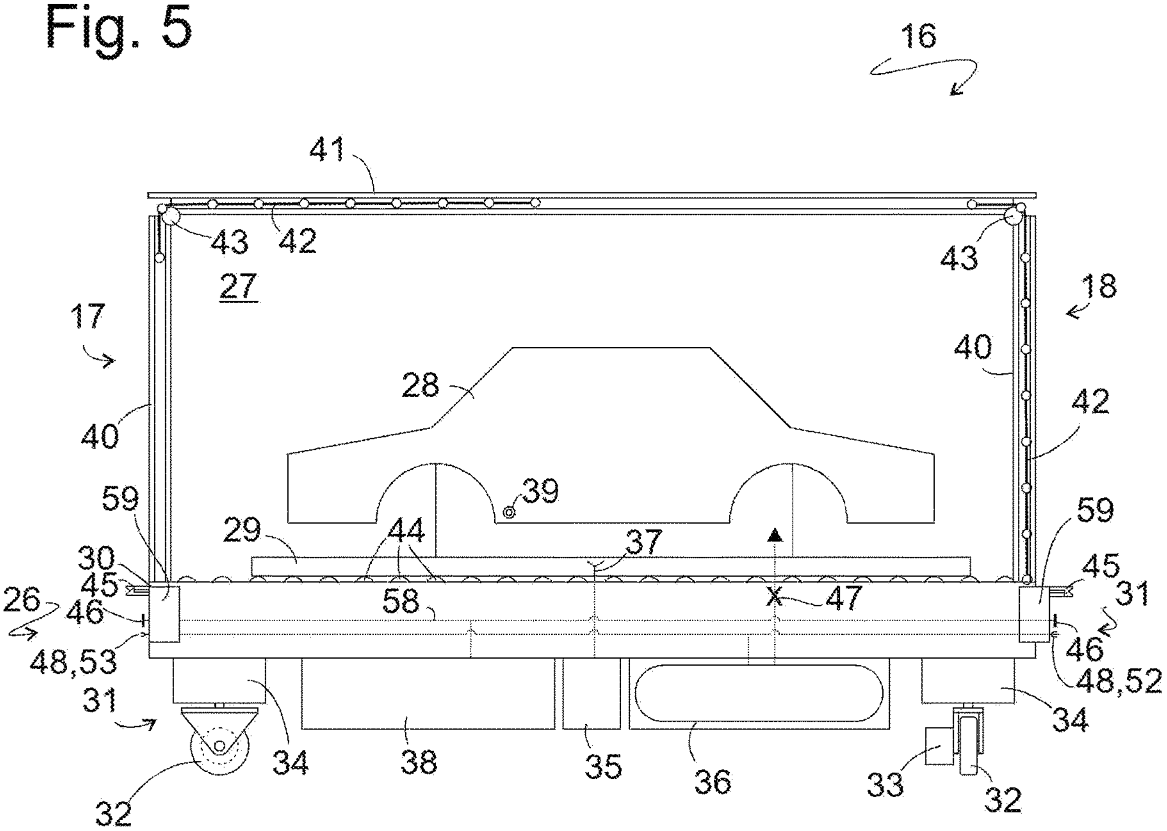
FIG. 5 is a diagram of a trolley used in the production lines of FIGS. 2, 3 and 4.

FIG. 5 is a schematic view of one of the trolleys, e.g. trolley 16. The trolley has an undercarriage 26 which supports a box shaped compartment 27 for receiving a car body 28 on a substructure 29.

The undercarriage 26 comprises a rectangular chassis 30 with four casters 31 at its corners. Each caster 31 comprises a wheel 32, a first electric motor 33 driving the wheel 32, and a second motor 34 for rotating the wheel 32 and its associated motor 33 around a vertical axis. Motors 33, 34 of the four casters 31 are controlled independently by an onboard computer 35, enabling the trolley to drive in curves, to rotate on the spot or to change its direction of displacement arbitrarily while maintaining its orientation.

The undercarriage further carries a pressurized air container 36 for pressurizing compartment 27 by dust-free air and a battery pack 38 for powering the motors 33, 34, the computer 35 and a magnetic valve 47 which controls airflow from container 36 to compartment 27.

The computer 35 has a wireless interface 37 for communication with other computers of the production line and with a transponder 39 attached to the car body 28.

The compartment 27 is delimited by pillars 40 at its four corners, by a roof 41 carried by the pillars 40 and by sidewalls extending between the pillars 40 along the two longer sides of the chassis 30. At the two shorter sides, slidable doors serve as inlet and outlet ports 17, 18. Leaves of the doors are flexible or articulate, so that the doors can be opened without the door leaves protruding beyond the outline of the compartment 27. For example, the door leaves may be formed as a roller blind 42 that is guided in grooves of the pillars 40 and can be raised and lowered by rotation of a sprocket 43 controlled by computer 35. The left port 17 is shown in an open state in which most of the roller blind 42 extends along the roof 41; the right-hand port 18 is closed with an end of the roller blind 42 touching the chassis 30.

When the trolley 16 is in an idle state, computer 35 scans for wireless messages indicating a workstation where a car body is ready for transport or will soon be. The requester sending such a message may be the workstation itself or a central computer controlling operation of the workstations. When a message is received, trolley 16 calculates the distance or the time needed to reach the workstation and places a bid indicating the result. Among several such bids, requester chooses the one from the trolley where distance or time is smallest, and sends a return message to said trolley 16 indicating that its bid is accepted. The trolley 16 then navigates to the workstation indicated, and docks one of its port 17, 18 to a port of the workstation.

When facing ports of the workstation and of the trolley open, a positive pressure in compartment 27, upheld by air flowing from container 36 through valve 47 ensures that air will blow out through gaps between the ports, so that no dust can reach the compartment 27 while car body 28 and substructure 29 are transferred into it. After having received the car body 28, port 17 closes again.

Displacement of the car body 28 within compartment 27 may be facilitated by a plurality of rollers 44 rotatably mounted in an upper surface of chassis 30 for supporting the substructure 29. For actively moving the car body, some of the rollers may be motorized.

Instructions concerning the destination of the car body 28 can be provided directly by the central computer. Alternatively, the trolley's computer 35 retrieves from transponder 39 either an identifier which it can use to query the processing status of the car body 28 from the central computer, or it retrieves the processing status of the car body directly from its transponder 39.

The processing status identifies steps of the painting process to be applied to the car body 28, their order of execution, the workstations in which they are carried out and, where appropriate, processing data such as an identifier of a color to be applied, a region of the car body where the color is to be applied, and the like. Whenever a particular step of the painting process has been carried out, it is labeled as done in the processing status. Based on this processing status, the computer 35 identifies the next step to be carried out, and the workstations capable of carrying it out. It then sends a request for allocation of a processing time slot to all these. The workstations respond by communicating their next available time slot, and the computer 35 chooses the one requiring least waiting time, sends a reply message booking this time slot and sets out to bring the car body 28 to the work station it has booked. In the meantime, air is flowing continuously from container 36 into compartment 27.

Figure 6:
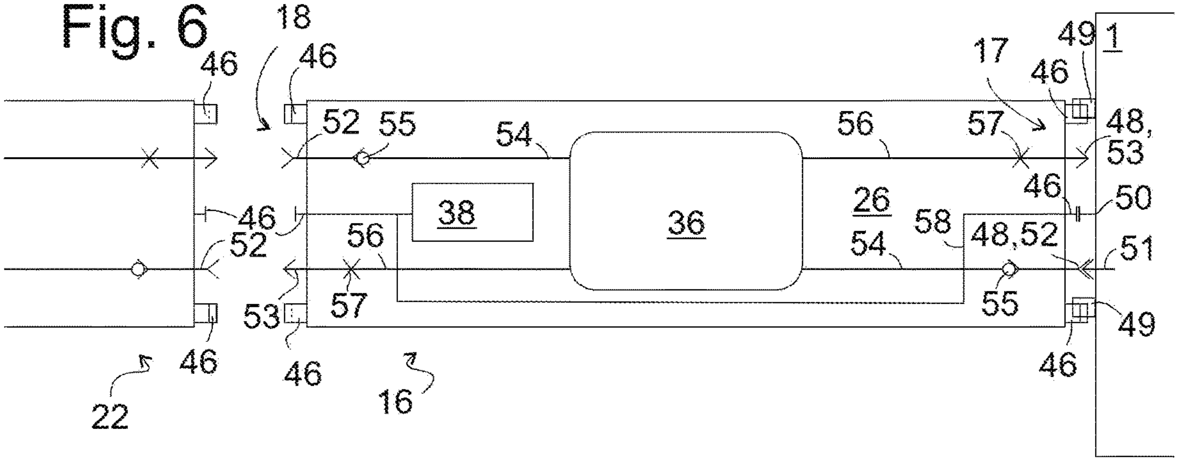
FIG. 6 is a schematic section of the trolley's undercarriage in accordance with the disclosure.

Docking to that workstation can be done by either port 17 or 18. For docking, each port of the trolley 16 has a mechanical coupling 45 associated to it, e.g., a pivotable hook, which is adapted to lock to a mating hook 49 of the workstation by a positive fit when the trolley 16 approaches the workstation, so that the trolley is prevented from moving relative to the workstation while a car body is being transferred between the two. FIG. 6 shows couplings 45, 49 of the trolley 16 and of a workstation, e.g. 1, slightly offset in a lateral direction merely to facilitate distinction between the two. Further, an electrical connector 46 is provided by which, while the trolley 16 is docked to the workstation 1, mains electric power is transferred to it via the workstation 1.

Energy-intensive tasks of the trolley 16 such as transferring the car body between the workstation 1 and the trolley 16, heating or cooling the compartment 27 may be enabled only while the trolley 16 is thus connected to power mains 50. Thereby, load on the battery 38 is reduced, and the productivity of the trolley 16 is improved since the fraction of its operating time spent charging the battery 38 is reduced. Times the trolley 16 spends connected to a workstation can thus be used for recharging the battery 38 via a power line 58 extending through the undercarriage 26. Since the amount of electric power transferred to the battery 38 must just be sufficient to enable operation of the trolley 16 until it reaches the next workstation having a mains connector 50, the battery 38 can be small and lightweight. Not all of the different types of workstations described above have to be equipped with such a mains connector, but in practice, a large fraction of them will be.

If desired, the electrical connector 46 may also be used for transferring data from the workstation to the computer 35 of the trolley 16, e.g. the processing status of the car body 28 carried by the trolley, after the workstation has carried out its associated processing step on the car body.

Similar to electrical connector 46, a pneumatic connector 48 is provided adjacent to each port 17, 18 of the trolley 16, so that whenever the trolley 16 is docked to a workstation 1 equipped with a mating pneumatic connector 51, the container 36 is refilled. As shown in FIG. 6, the pneumatic connector 48 associated to port 17 comprises an inlet port 52 and an outlet port 53. The inlet port 52 mates with connector 51 of workstation 1. An air duct 54 extending inside undercarriage 26 from inlet port 52 to container 36 comprises a check valve 55 which prevents air from leaking from inlet port 52 when unconnected. An air duct 56 extending between outlet port 53 and container 36 comprises a valve 56 which opens only when outlet port 53 mates with some external inlet port. Since workstation 1 has no such inlet port, the valve 56 associated to port 17 is closed.

On the side of undercarriage 26 located below port 18, there is an identical assembly of electrical and pneumatic connectors 46, 48 facing connectors of an approaching trolley 22. The assemblies are inversion symmetric so that the assembly of port 18 might connect to workstation 1 just in the same way the assembly of port 17 does. When trolley 22 advances further towards trolley 16, their mechanical couplings 45 engage and lock both to each other in a position where their electrical connectors 46 make contact, and wherein inlet and outlet ports 52, 53 of the two trolleys 16, 22 engage. Although each inlet port only couples to an outlet port of the other trolley and might therefore be regarded as a male/female couple, the pneumatic connector 48 as a whole is hermaphroditic.

In the docked state, the battery of trolley 22 can recharge from mains power fed through to it by power line 58 of trolley 16. The valve 57 on port 18 side of trolley 16 is open due to outlet port 53 engaging inlet port 52 of trolley 22, so that container 36 of trolley 22 can refill, too, while trolley 22 is waiting for trolley 16 to finish its task at workstation 1.

When trolley 16 has finished its task, trolley 22 can back off in order to allow trolley 16 to move away and then dock to workstation 1 in its place. In a preferred embodiment, and as outlined in FIG. 5, mechanical couplings 45 and connectors 46, 48 of the trolleys are mounted on supports 59 which are displaceable with respect to their respective undercarriage 26 along the engagement direction of connectors 46, 48. When docking to a workstation or to another trolley, the support 59 is in an advanced position shown on the port 18 side of FIG. 5. When trolley 16 has finished its task at workstation 1, it withdraws both supports 59 into a retracted position as shown on the port 17 side of FIG. 5. Thanks to casters 31, the trolley 15 can then leave its position in front of workstation 1 in a direction orthogonal to said engagement direction, i.e. it can move out of the gap between workstation 1 and trolley 22 without requiring cooperation by trolley 22. This is particularly advantageous in case that several trolleys are queuing up before a same workstation, as considered above with respect to the baking station 11 in the discussion of FIG. 2.

The task of the trolley might be just to deliver a car body 28 to a workstation, or to fetch it from there after processing in the workstation. In each case a time-consuming docking process has to be carried out in order to ensure that the car body can be unloaded from or loaded into the trolley properly. Such a two-fold docking is inevitable if a trolley is to be reused in a new task as soon as it has discharged its payload at a workstation, and another trolley may come to fetch it after processing by the workstation is finished. In that case, in order to minimize idle time of a workstation, it may be necessary to provide the workstation with two ports, so that when processing of a car body in the workstation is about to finish, and one trolley that will carry away the finished car body is docking to one of the ports, another, carrying a new car body to be processed, may be docking to the other. With the trolley and the production line of the present invention, it is more efficient to have a trolley wait at a workstation while a car body it has brought is being processed, and to have the same trolley take it away again when processing is finished. Thus the time spent in docking processes is reduced by half, and since the time the trolley spends docked to the workstation is made efficient use of, the productivity of the trolley can be just as high as or higher than that of a trolley which from time to time has to abandon the production line in order to be recharged. Moreover, when after processing the car bodying is loaded onto the trolley that brought it, a high efficiency of the workstation can be achieved even if the workstation has just a single port, which significantly reduces the cost of the workstation.

The ports of the trolley and/or of the workstations preferably comprise a slidable door. Slidable doors can be opened after the ports of the trolley and of the workstation have been placed in mating relationship, so that entry of dust through gaps between the ports can be minimized, or can be prevented altogether by a slightly positive pressure in the compartment and/or the workstation.

The door should comprise a flexible sheet. By displacing the sheet continuously around an edge of the compartment from a face side facing the workstation to e.g. a sidewall or a roof of the compartment, the slidable door can fill almost the entire face side and can nevertheless be opened without increasing the dimensions of the trolley.

In order to facilitate loading and unloading work pieces, the trolley may comprise a rail portion for displaceably supporting the work piece. When this rail portion is coupled to a rail of a workstation, the work piece can be transferred easily and smoothly along the rail and the rail portion.

In the production line, more than two workstations should have ports by which a work piece can be transferred to or received from the trolley. Thus, the trolley can take up a work piece at the port of one workstation and choose a workstation to which the work piece is to be delivered, or collect work pieces from several workstations and deliver these to a same target workstation.

In order to minimize idle time of a workstation, the workstation should have at least two ports to which a trolley can be coupled, so that loading a processed work piece on one trolley and unloading the next work piece to be processed from another trolley can take place simultaneously at different ports.

According to a second aspect of the invention, the object is achieved by a trolley comprising a motorized steerable undercarriage, a storage space for a work piece, a first connector for receiving a commodity from an external source and a second connector for outputting said commodity to an external sink. The external source can be a charging station or another trolley that is docked to a charging station; the sink, if one is connected, will generally be another trolley of the same type.

Preferably, the trolley is an autonomous guided vehicle, AGV.

Autonomy of the trolley can imply that the trolley, in an unloaded state, is adapted to identify a workstation that has finished or is about to finish a processing step associated to it, to navigate to said workstation and to be loaded there with a work piece after said processing step has been finished on it.

Analogously, the trolley may be adapted to, when loaded, identify a next processing step to be carried out on the work piece, to identify a next workstation associated to said next method step and to drive the work piece to said next workstation. The identification of said next processing step may be based on data the trolley charges from the workstation while being docked to it.

Preferably the first and second connectors are located on opposite sides of said undercarriage so that when on one side of the undercarriage the first connector faces a station to which the trolley is docked, the second connector on the opposite side is free to accommodate a second trolley. In order to enable efficient docking, the side where the first connector is located should be a front side of the trolley in a normal displacement direction thereof, so that a connection can be established simply by the trolley approaching the charging station in its normal displacement mode, and the second trolley can connect to the second connector at the rear side by moving in the same displacement mode.

Preferably, the first and second connectors are hermaphroditic, so that the trolley can make contact to a charging station with whichever one of its connectors happens to be in front when the trolley approaches the station.

The trolley should comprise storage means for the commodity in communication with said first connector.

As mentioned above, the storage space of the trolley can be a dust-proof compartment. In that case, the commodity should comprise pressurized gas, and the trolley should comprise means, in particular, valves, for metering said pressurized gas into the compartment. Thus entry of dust into the compartment can be prevented even if the compartment isn't hermetically sealed, since air escaping through gaps of the compartment will prevent dust from entering through these or through the at least one port.

Where the trolley comprises a rail portion for displaceably supporting the work piece, the rail portion may be adapted to be connected to the rail portion of a second, identical trolley. In that way, a work piece can be conveyed from said second trolley to a workstation or vice versa via the first trolley, without any of the trolleys having to move and to interrupt charging.

For the trolley, it is also advantageous to have a plurality ports in order to minimize the amount of maneuvering needed for coupling to a workstation port. Preferably, there are two ports provided at opposite sides of the dust-proof compartment, in association to the first and second connectors of the undercarriage.

To enable the trolley to identify a next method step to be carried out on the work piece loaded into it and to identify a target workstation for said work piece, each work piece should have associated to it a schedule of method steps to be carried out on it, which is accessible to the trolley.

For accessing the schedule, the trolley may comprise a reader, for example a RFID reader, for reading data from a data carrier of a work piece. The data may comprise the schedule itself, or a reference by which the schedule can be retrieved from a database.

Each workstation may have a recording device associated to it for writing into the schedule of a work piece processed by it a record identifying the workstation and/or its associated method step, so that when the work piece is loaded onto a trolley, the trolley can find out the next method step due to be carried out on the work piece, and find an appropriate workstation to deliver the work piece to.

For good maneuverability the undercarriage may comprise a plurality of casters that are drivable independently and are rotatable around a vertical axis.

Further features and advantages of the invention will become apparent from the subsequent description of embodiments, referring to the appended drawings.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

REFERENCE NUMERALS

1-6 workstation (paint station)
7-8 track switch
9-12 workstation (baking station)
13 workstation (flashing station)
14 track
15 outlet port
16 trolley
17 inlet port
18 outlet port
19 inlet port
20 straight line
21 U-turn
22 trolley
23 corridor
24 heater
25 segment
26 undercarriage
27 compartment
28 car body
29 substructure
30 chassis
31 caster
32 wheel
33, 34 motor
35 computer
36 pressurizing means
37 wireless interface
38 battery pack
39 transponder
40 pillar
41 roof
42 roller blind
43 sprocket
44 roller
45 mechanical coupling
46 electrical connector
47 magnetic valve
48 pneumatic connector
49 hook
50 power mains
51 pneumatic connector
52 inlet port
53 outlet port
54 air duct
55 check valve
56 air duct
57 valve
58 power line
59 support

What is claimed is:

1. A production line for processing a work piece in successive steps, the production line comprising:
a plurality of stations; and
a plurality of trolleys, each of which comprises a first connector and a storage space for the work piece;
wherein the plurality of stations comprises at least one workstation adapted for carrying out an associated one of said successive steps and at least one charging station comprising a second connector for providing a commodity to one of said trolleys when connected to the first connector of said trolley;
wherein at least one of said trolleys comprises a second connector that communicates with the first connector; and
wherein the storage space is a dust-proof compartment having at least one port adapted to be coupled in a dust-proof manner to mating ports of the at least one workstation.

2. The production line of claim 1, wherein said at least one of said workstations is also a charging station.

3. The production line of claim 1, wherein the commodity comprises one or more of electric power, data, fuel, pressurized gas or vacuum.

4. The production line of claim 1, wherein the second connector of said trolley is identical to the second connector of one of said charging stations.

5. The production line of claim 1, wherein the port of the trolley and/or of the workstation comprise a slidable door, and wherein the door comprises a flexible sheet.

6. A trolley comprising:
a motorized steerable undercarriage;
a storage space for a work piece;
a first connector for receiving a commodity from an external source; and
a second connector for outputting the commodity to an external sink;
wherein the commodity comprises pressurized gas, and the trolley comprises means for metering said pressurized gas into the compartment.

7. The trolley of claim 6, wherein the trolley is an AGV.

8. The trolley of claim 6, wherein the first and second connectors are located on opposite sides of said undercarriage.

9. The trolley of claim 8, wherein the first connector is located on a front side of the undercarriage in a normal displacement direction, and the second connector is located on a rear side.

10. The trolley of claim 6, wherein the first connector of the trolley is adapted to be connected to the second connector of a second, identical trolley.

11. The trolley of claim 9, wherein the first and second connectors are hermaphroditic.

12. The trolley of claim 6, further comprising a storage device for the commodity in communication with said first connector.

13. The trolley of claim 6, wherein the storage space is a dust-proof compartment.

* * * * *